March 26, 1963 S. K. RASMUSSEN 3,082,970

ELECTROCARDIOGRAPH

Original Filed Nov. 24, 1958 6 Sheets-Sheet 1

INVENTOR
SHERRILL K. RASMUSSEN
by Mason, Kolehmainen,
Rathburn and Wyss.
ATTORNEYS.

INVENTOR
SHERRILL K. RASMUSSEN
by Mason, Kolehmainen, Rathburn and Wyss
ATTORNEYS.

INVENTOR
SHERRILL K. RASMUSSEN
by Mason, Kolehmainen,
Rathburn and Wyss.
ATTORNEYS.

INVENTOR
SHERRILL K. RASMUSSEN
by
Mason, Kolehmainen, Rathburn and Wyss
ATTORNEYS March 26, 1963 S. K. RASMUSSEN 3,082,970

ELECTROCARDIOGRAPH

Original Filed Nov. 24, 1958 6 Sheets-Sheet 5

INVENTOR

SHERRILL K. RASMUSSEN by

Mason, Kolehmainen, Rathburn and Wyss

ATTORNEYS.

INVENTOR.
SHERRILL K. RASMUSSEN
BY Mason, Kolehmainen, Rathburn and Wyss
ATTORNEYS.

United States Patent Office 3,082,970

Patented Mar. 26, 1963

3,082,970

ELECTROCARDIOGRAPH

Sherrill K. Rasmussen, Milton Junction, Wis., assignor to The Burdick Corporation, Milton, Wis., a corporation of Delaware Continuation of application Ser. No. 775,774, Nov. 24, 1958. This application May 8, 1962, Ser. No. 197,218
11 Claims. (Cl. 242—55.53)

The present invention relates primarily to electrocardiographs although certain features of the invention may be applied to other devices. This application is a continuation of a prior copending application Serial No. 775,774, filed November 24, 1958.

An electrocardiograph is a heart diagnostic instrument employing a tape which is driven continuously when the tape is in operation and upon which a curve is drawn to indicate substantially the electric potential changes between different parts of the body responsive to heart action. Essential elements of such a device are tape storing, handling and driving mechanisms, a tape marking device, a high gain amplifier system for actuating the marking device, a plurality of electrodes for attachment to the body together with their attendant cables and switching means for connecting the cables in different combinations to the amplifier. Most of these components are assembled within a chassis and a case is provided to house the equipment.

One of the primary objects of the present invention is to provide such an instrument with improved tape handling mechanism having a number of new and advantageous features. One of these features provides a new tape supporting mechanism which makes it possible easily to insert a new roll of tape in the machine and in which threading of the tape relative to the driving and marking mechanism is effected in a very easy manner. A further object of the present invention is to provide an instrument in which sharp markings are produced by means including a knife edge and in which the curl resulting from drawing the paper over the knife edge is eliminated.

Another object of the invention is the provision of a tape guiding means so arranged relative to the tape driving means that the tape is prevented from curling as under adverse humidity conditions.

A further object of the present invention is to provide a new and improved electrocardiograph having a pivotally movable tape supporting platen assembly which is pivotally mounted for movement between an operative and tape receiving inoperative position and which is so contructed and arranged that it is latched in its operative position and when unlatched is moved a short distance where it can be readily grasped manually for movement to the tape inserting position.

A further object of the present invention is to provide tape handling mechanism constructed and arranged to place a uniform drag on the tape as it is pulled from the supply spool and which means is also constructed and arranged to permit readly insertion of a spool of tape on its supporting mechanism.

A further object of the present invention is to provide tape handling mechanism with improved means for lateral guiding of the tape as well as to provide a tape drive which is practically self-aligning and in which the tape is squared relative to its path of movement with a short run of the tape.

In brief, the electrocardiograph of the present invention includes a suitable cabinet within which is mounted a chassis supporting, among other things, a tape drive mechanism comprising a capstan adapted to be driven selectively at a high or low speed. Upon the chassis is also mounted a galvanometer having a stylus disposed for movement in a substantially horizontal plane. The tape handling mechanism of the invention includes a platen assembly pivotally mounted about an axis located in close proximity to the capstan. The assembly includes a movable carriage upon which are mounted a number of elements including a knife edge defining structure around which the tape is moved and which is so disposed that in the operative position of the carriage the tape is maintained in engagement with the stylus. In the operative position the pinch roller is maintained firmly and positively in contact with the capstan and with the tape interposed between the two. It is so maintained by a novel locking mechanism associated with the carriage and structure mounted upon the chassis so that there is provided a mounting positively holding the pinch roller and tape is engagement with the capstan. Upon the carriage are also mounted several suitable tape guiding means as well as a roller interposed between the knife edge and the capstan and pinch roller assembly, this arrangement being such that the tape is curled in one direction over the knife edge and in a reverse direction as it passes the guide means whereby passage over the later removes from the tape the curl just placed into it by reason of its being drawn over the knife edge. The carriage also supports a pivotally mounted tape supply spool support. This support is mounted between a loading and an operative position. It is biased toward the operative position and the arrangement is such that in the operating position the bias maintains the tape on the supply spool in engagement with an undersurface of the platen thereby to maintain the tape at a uniform tension. The platen assembly also includes means engaging the opposite sides of the tape thereby laterally to center the tape under various conditions. The platen assembly is latched in operative position by releasable means and the arrangement is such that when the latch is released the platen assembly is freed to move a short distance thereby to raise a portion of it above the top of the electrocardiagraph cabinet so that it can be readily grasped manually. Thereafter it can be manually moved to the tape loading position.

The platen assembly is normally covered by a transparent hinged cover element through which the tape is readily visible for inspection of the recording thereon. This hinged cover is utilized to maintain the tape against the upper surface of the platen and to direct it to an exit constituted by an aperture in a frame member encircling the cover. The exit is provided with serrations whereby the tearing of portions of the tape is facilitated. The cover element is also so constructed and arranged as to prevent the tape from wrinkling as a result of being fed under adverse humidity conditions.

The tape is practically self-aligning by reason of the short distance between the supply spool and the exit from the tape driving means, the latter of which takes the form of a capstan-pinch roller type of tape pulling mechanism.

Other objects and advantages of the present invention will become apparent from the ensuing description of illustrative embodiments of the invention in the course of which reference is had to the accompanying drawings, in which.

Figure 1:
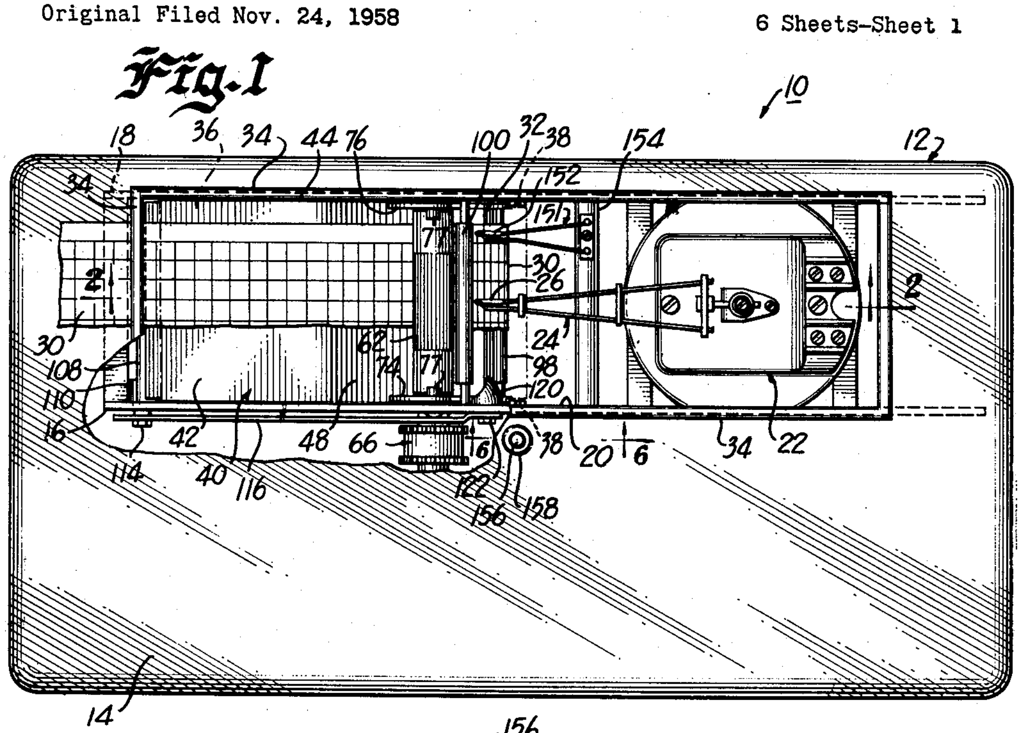
FIG. 1 is a top plan view, partly broken away, of an electrocardiograph constructed in accordance with the present invention.
Figure 9:
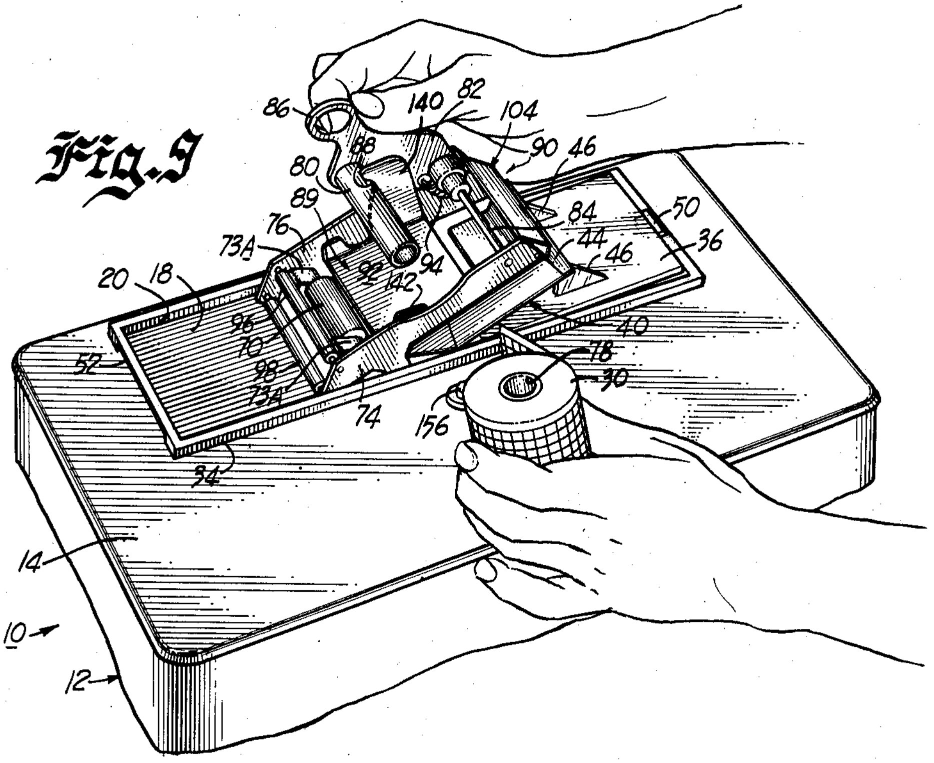
FIG. 9 is a fragmentary perspective view illustrating the apparatus in position to receive a new roll of tape.
Figure 10:
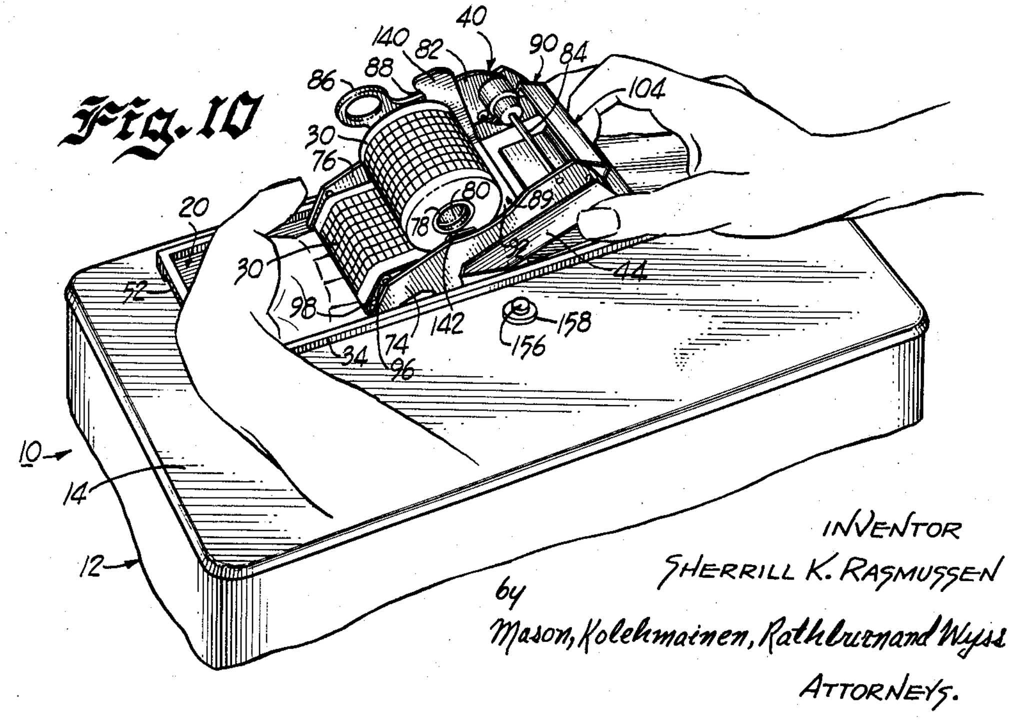
FIG. 10 is a view similar to FIG. 9 illustrating an intermediate position of the tape loading operation which requires simply a movement of the tape beyond the knife of the platen assembly.

Referring now to the drawings and first particularly to FIG. 1 and also to FIGS. 9 and 10, the electrocardiograph of the present invention is illustrated as a whole by the reference character 10. It includes a cabinet 12 having a top 14 within which is mounted a suitable chassis for the various mechanical parts and amplifying apparatus, the latter of which may be of well known construction and is not illustrated or described. The chassis does, however, include a pair of spaced apart vertically disposed supporting plates 16 and 18 between which the cabinet top is apertured to provide an opening indicated generally by the reference character 20.

Figure 2:
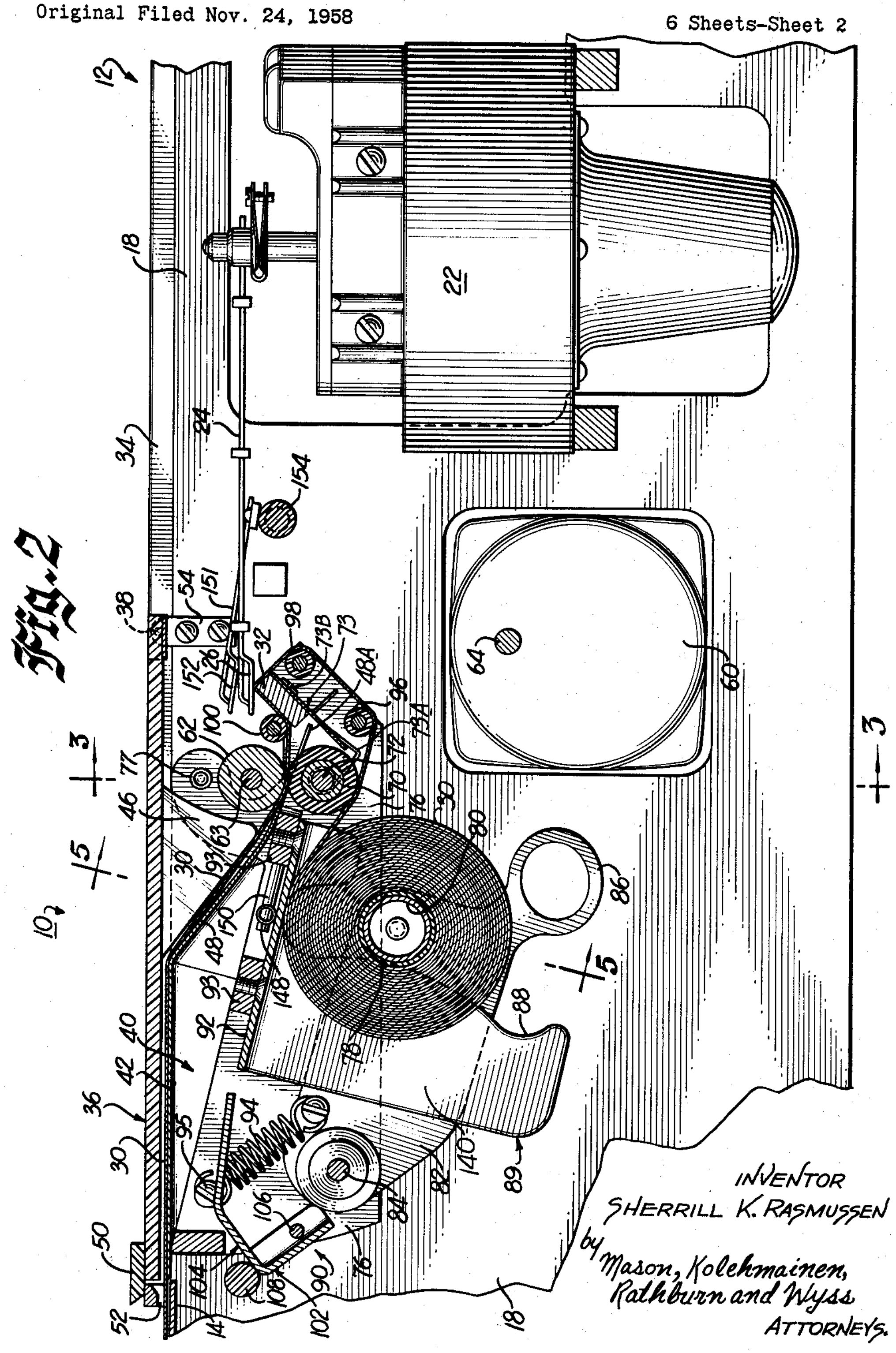
FIG. 2 is an enlarged fragmentary vertical cross-sectional view taken along the line 202 of FIG. 1.

Referring particularly to FIG. 1, the electrocardiograph includes a galvanometer 22 viewable through the opening and adapted to actuate a stylus 24 having a heated stylus portion 26 adapted to be moved transversely in a horizontal plane in contact with the recording medium. This medium may be a heat sensitive tape 30 driven over a knife edge 32 underneath the stylus portion 26 thereby to provide markings on the tape of the excursions of the stylus and thus of the heart generated voltages. The periphery of the opening 20 is surrounded by a rectangular frame 34 with which is associated a hinged cover portion 36 (omitted from FIG. 1) pivotally movable about a horizontal axis defined by the supporting pins 38. The cover is adapted in operative condition of the apparatus to overlie the platen assembly 40 of the present invention, as best illustrated in FIG. 2. In this position the left hand portion of the cover overlies a horizontal portion 42 of a platen carriage 44, being slightly spaced therefrom to allow free movement of the tape. The cover is provided with a pair of spaced apart generally triangular dependent presser portions 46 adapted to overlie forwardly and upwardly inclined portions 48 of the platen carriage. The cover is also provided at its front end with a stop 50 adapted to rest on the frame 34 and the front end of the frame is provided with an exit passageway 52 which may be serrated at its underside to facilitate tearing of the tape when desired. The pivot pins 38 and the cover 36 are mounted on opposed brackets 54 secured to the chassis supports 16 and 18.

Figure 3:
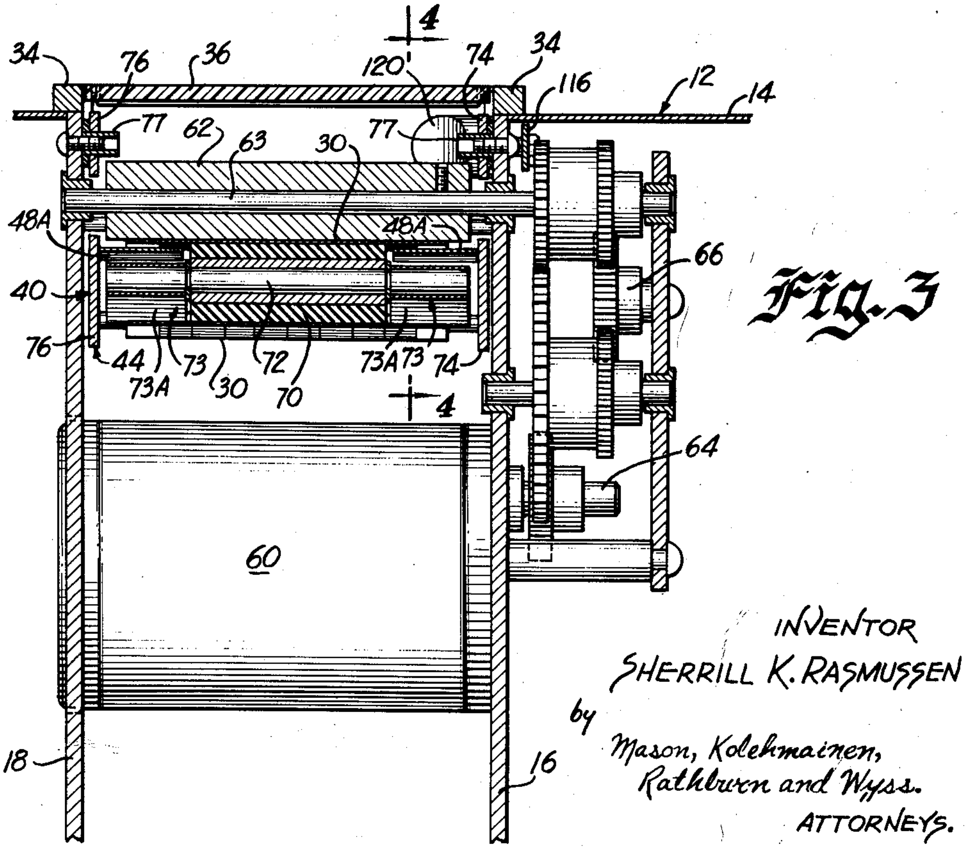
FIG. 3 is a transverse vertical cross-sectional view taken along the line 3—3 of FIG. 2.

The tape is adapted to be driven by a motor indicated generally by the reference character 60 in FIGS. 2 and 3. It may be of known construction and if two tape speeds are desired, it may be of a type adapted to be operated in different directions and suitably connected by gearing adapted to drive a tape driving capstan 62 at two different speeds in the same direction. The capstan is mounted on shaft 63 and driven from a motor output shaft 64 and through gearing 66. The capstan shaft 63 is supported for rotation on the spaced apart chassis supports 16 and 18 and is driven in the same direction at either one speed or another depending upon the energization of the motor 60.

In the main, the present invention has to do with the tape driving and handling mechanism, the major structural component of which is the platen assembly 44. This assembly is movable between two positions, a first of which is the operative position illustrated in FIG. 2 and the second of which is the loading position illustrated in FIGS. 7 and 9.

Figure 4:
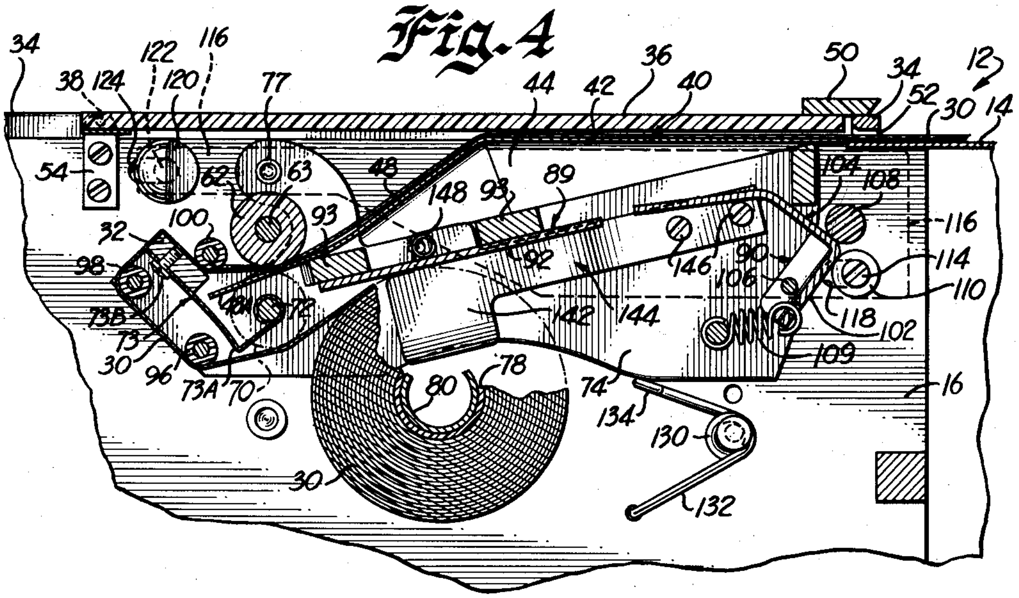
FIG. 4 is a further enlarged vertical longitudinal cross-sectional view taken along the line 4—4 of FIG. 3.

In the operative position of the platen assembly, illustrated partly in FIG. 2 and also in FIG. 4, the tape 30 is driven or rather pulled past the knife edge 32 by the capstan against which the tape is firmly and positively held by a pinch roller 70 rotatably mounted on a shaft 72 supported from the vertically disposed side walls 74 and 76 of the platen carriage 44. The pinch roller shaft 72 is supported from the side walls by a pair of slightly resilient supports 73A forming tongue like parts of a bracket 73 secured by screws 73B to the knife edge 32, which is also supported from the side walls 74 and 76. The platen assembly is mounted on the spaced pivots 77 mounted in the frame plates 16 and 18 a short distance above the capstan 62 and its shaft 63.

The tape is drawn from a tape supply spool 78 mounted on a stub shaft 80 secured to an arm 82 in turn pivotally mounted upon the platen side walls 74 and 76 by means of a shaft 84 extending between these two walls. The arm 82 has a finger receiving portion 86 to facilitate movement of the spool shaft to the loading position illustrated in FIG. 9. Movement in the loading position is limited by engagement of stub shaft 80 with arcuate stop structure 88 formed on a platform element 89 secured to the side walls 74—76 of the platen carriage 44 by crosspiece 93 (see FIG. 2).

Figures 7, 8:
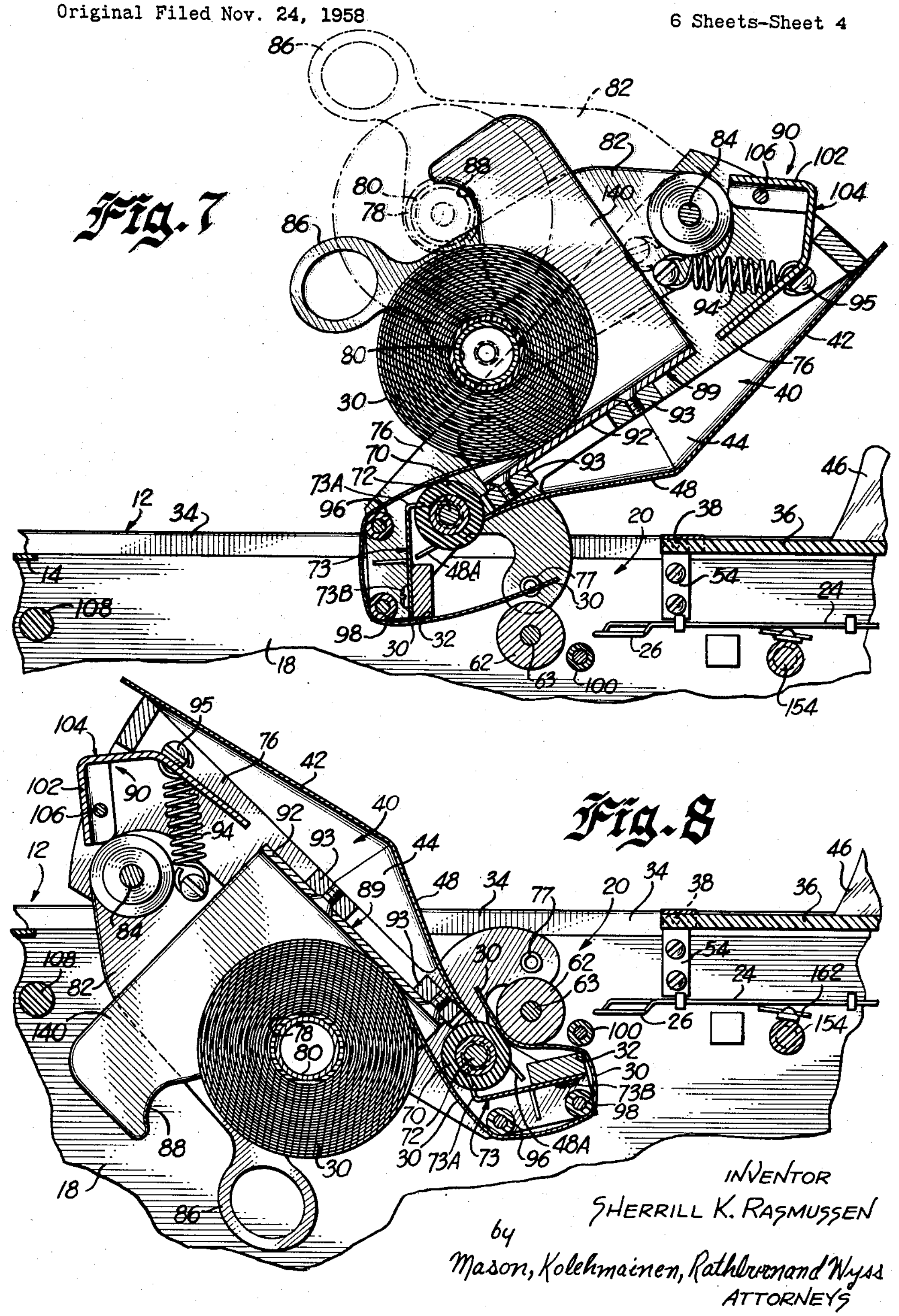
FIG. 7 is a fragmentary cross-sectional view similar to FIG. 2 but illustrating the platen assembly carriage in its tape loading position and illustrating in phantom the support spool in position to receive a roll of tape.
FIG. 8 is a view similar to FIG. 7 showing the platen assembly in an intermediate position as it is being moved from the tape loading to the operative position.

In order to maintain the tape at a uniform tension as it is being drawn from the spool, the spool is resiliently biased as against the underside of the cross wall 92 of the platform element 89 constituting part of the platen carriage 44 as best shown in FIGS. 4, 7 and 8. The resilient biasing force is exerted by a spring 94, one end of which is secured to the arm 82 and the other to a screw 95 on the side wall 76 of the platen carriage. It will be noted that with this construction the tape of the supply spool is held with a substantially constant fricional force against the surface 92 irrespective of the amount of tape on the spool.

In the operative position and condition the tape is withdrawn from the spool 78 past the knife edge 32. In its passage to the knife edge it passes over the spaced apart guide rollers 96 and 98 which, like the knife edge, may be described as located in the nose of the platen assembly 40 between the sidewalls 74 and 76. In the operative position the knife edge is disposed so as to define a substantially V-shaped support for the tape as it passes underneath the heated portion 26 of the stylus.

A curl that is placed in the tape as it passes over the knife edge is removed by passing the tape around a bend, that is a reverse of the knife edge. In the present apparatus this reverse bend is provided by passing the tape around another guide roller 100 supported between the frame plates 16 and 18 between the knife edge and the capstan and pinch rollers in the operative position of the apparatus. From the capstan the tape moves upwardly past the inclined portion 48 of the platen assembly and then past the horizontal portion 42 and through the exit 52.

In an apparatus such as that illustrated where a knife edge is used to provide sharper records, a considerable force is required to pull the tape. In order that an unvarying and effective drive be provided, the pinch roller 70, which has a resilient periphery, and is mounted on the slightly resilient tongues 73A, is positively maintained in engagement with the capstan. This positive engagement is effected by holding the platen carriage 40 in its operative position through a rigid lever, this lever being constituted by one arm 102 of a somewhat U-shaped lever indicated as whole by reference character 104 and mounted for pivotal movement about an axis defined by shaft 106. Referring still to FIG. 2, it may be noted that the lever portion 102 is substantially in line between the pivot shaft 106 and a stop rod 108 extending across the side walls 16 and 18 of the chassis, the lever being biased to this position by spring 109 secured to lever arm 102 and side wall 74 of the platen assembly (see FIG. 4). Incidentally, the lever 102 is quite wide, it extending substantially across the space between the side walls 76 and 78 of the platen assembly.

The platen assembly is latched in its operative position and when it is desired to place in a new spool of tape, the assembly has to be unlatched. The latching is effected by the same lever 102 utilized positively to hold the platen assembly in its operative position. To unlatch the assembly, the lever 102 is moved in a clockwise direction, as viewed in FIG. 2, and in a counterclockwise direction, as viewed in FIG. 4, the latter of which best illustrates the latch release. The actual release of the latch 102 is effected by a nylon spool 110 mounted as by a screw 114 upon a horizontally reciprocable plate 116. The plate is mounted to the outside of the frame plate 18, as best illustrated in FIG. 1, and the screw 114 extends through a slot 118 in the support plate 18. The end of the latch release plate 116 remote from the spool 110 is provided with a finger piece 120 secured to the latch plate by a screw 122 also extending through an elongated slot 124 in the side wall 18. The two screws 114 and 122 thus support the latch plate on the side walls and permit reciprocation of plate 116. The reason for the specific construction is to locate the latch plate away from the tape drive and to locate the thumb actuator in the opening 20 to facilitate release of the assembly.

When the releae mechanism is actuated the present invention provides for movement of the platen assembly toward its loading position. This position is approximately that of FIG. 8 and the platen assembly is moved to this position by a helical biasing spring 130 (see FIG. 4) having one end extension 132 secured to the chassis wall 18 and the other end extension 134 disposed underneath the side wall 74 of the platen assembly. Once the platen assembly has been unlatched it moves to the position of FIG. 8 from whence it can be moved to the position of FIG. 7 for insertion of a spool of tape.

It will be noted that in the tape loading position the tape guiding rollers and pinch roller and knife edge are spaced a considerable distance from the capstan 62. Thus, when a spool of tape has been placed on the shaft 80 it is a simple matter to pull a length of tape from the spool and around the nose of the platen assembly, as illustrated in FIG. 7 and as graphically illustrated in FIG. 10. Then, all that is required in order to get the tape properly threaded is to move the carriage back to its operative position of FIGS. 2 and 4 where the platen assembly is latched by the latch lever 104.

The tape drive of the present invention is such as to provide immediate self-aligning of the tape. This results from the short distance between the tape spool and the tape driving rollers, i.e., the capstan and pinch roller.

Also, the tape supply is constructed to compensate for uneven width of paper rolls. This compensation is provided by means engaging opposite sides of the roll, which means is best illustrated in FIG. 5 to which reference is now had.

Figures 5, 6:
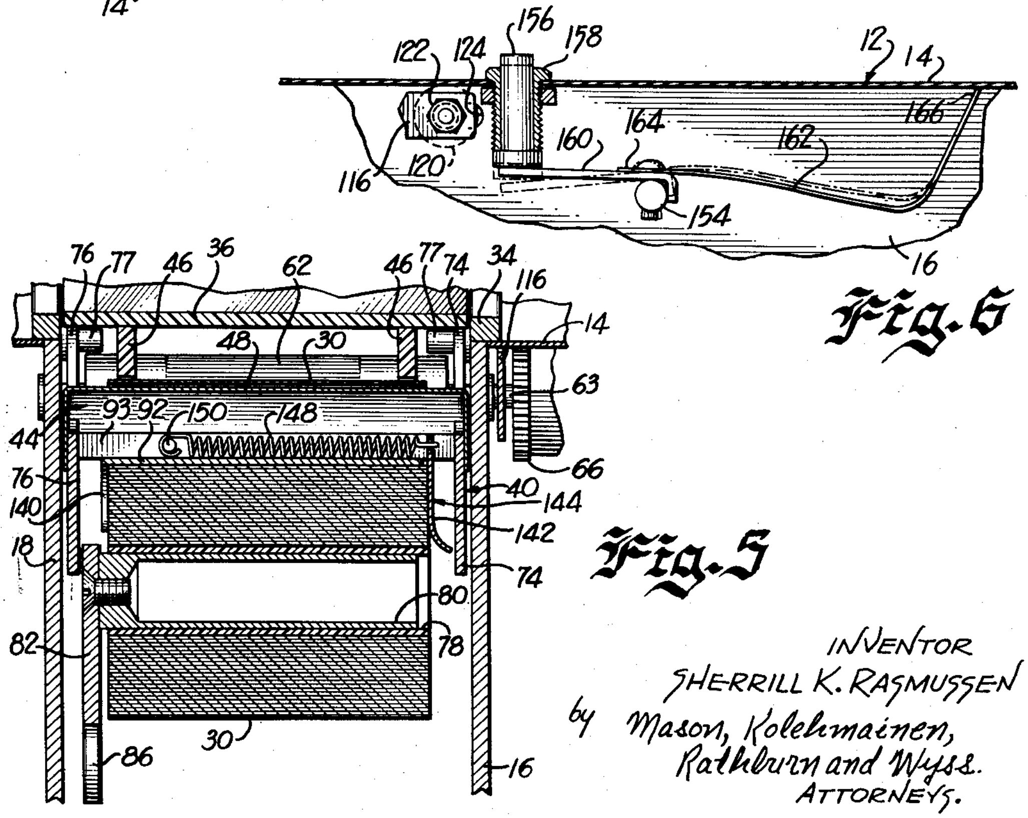
FIG. 5 is a fragmentary transverse cross-sectional view taken along the line 5—5 of FIG. 2.
FIG. 6 is a fragmentary vertical longitudinal cross-sectional view taken along the line 6—6 of FIG. 1.

In FIG. 5 it will be noted that the transverse wall 92, against which the tape is resiliently biased, is provided with a downwardly extending flange 140 forming part of structure 88 and bearing against one side of the spool of tape. A spring biased flange 142 bears against the other side. The flange 142 is provided at the end of a resilient lever 144, best shown in FIG. 4, and secured by the screws 146 to the side wall 74 of the platen carriage. The biasing force is provided by a helical spring 148, one end of which is secured to the lever 144 at the region of the flange 142 and the other end of which is secured to a pin 150 secured to a transverse member 92 of the platen assembly. If desired the platen assembly could be provided with a resilient flange taking the place of lever 144 and spring.

The electrocardiograph of the present invention is provided also with a second stylus 151 having a heated portion 152 adapted manually to be brought into engagement with the tape to provide desired coding marks. The stylus is mounted upon a rotatable shaft 154 extending across the side plates 16 and 18 underneath the stylus 24. This shaft is adapted to be turned manually by depression of a coding button 156, see FIGS. 1 and 6, mounted in a bushing 158 secured to the top 14 of the cabinet. The lower end of the button is operatively connected to the shaft by a lever 160 secured to the shaft. The shaft, lever, and button are biased to their indicated inoperative position in which the stylus 151 is out of engagement with the tape by means of a spring 162 illustrated in FIG. 6, one end 164 of which is connected to the shaft and level assembly and the other end 166 which bears against the underside of the cabinet top 14.

In reviewing the operation of the electrocardiograph, it will be assumed that the cover 36 is closed as shown in FIG. 1. Then, in order to get access to the tape handling mechanism, the cover 36 is opened. This gives access to the unlatching finger piece 120. The latter is moved to the right as viewed in FIG. 1, thereby to unlatch the platen assembly 40. The unlatching is effected by movement of the plate 116 to the left as viewed in FIG. 4. When the plate is so moved the unlatching spool 110 is moved to the left to move the lever 102 away from the latch rod 108. When this occurs, the spring 130 lifts the platen assembly from the position of FIG. 4 to the intermediate position of FIG. 8. When this movement occurs, the tape, assuming that there is some tape on the spool, remains between the capstan 62 and the pinch roller 70, as shown in FIG. 8. The platen assembly then can be manually moved to the position of FIG. 7, in which position the pinch roller 70 is moved some distance from the capstan 62 thereby to free the tape.

In this position the tape, if desired, can be readily removed from the apparatus. Likewise it is a relatively simple matter to put in another spool of tape. To describe this, reference is had to FIGS. 9 and 10. As a first step the spool support is moved by finger piece 86 to a limit position determined by the stop structure 88. The spool 78 with the tape 30 thereon is then placed on the spool shaft 80 and the supporting bracket 82 is released. When released, the spring 94 returns it to the solid line position shown in FIG. 7 and the position shown in FIG. 10. At this time the tape is frictionally held against the cross wall 92 thereby to prevent undesired unravelling of the tape and then with a force that provides a substantially constant tension against which the tape is drawn during operation by the capstan-pinch roller arrangement. A certain amount of the tape is then withdrawn, this length being sufficient to extend some distance beyond the capstan and pinch roller when they occupy positions of FIG. 7. The tape can be inserted in the space between capstan and the pinch rollers by insertion of the fingers into the space as shown in FIG. 10. Thereafter the platen assembly is depressed through the intermediate position of FIG. 8 and further against bias of spring 130 to the position of FIG. 4 where the platen assembly is automatically latched by engagement of lever 102 against the latch rod 108, the spring 109 permitting the latch 102 to go over the rod 108.

The capstan driving motor 60 is then run for a short time to feed a sufficient length of tape so that the tape can be run underneath the cover and through the opening 52. The tape does not have to be accurately aligned during the threading operation because of the short distance between the spool and the capstan-pinch roller assembly, this short distance providing a substantially quick self-alignment of the tape. The tape is also held in its squared position by the flanges 140 and 142 which act against the end of the tape spool.

The pulling of the tape around V-edge 32 during operation imparts a curl to the tape but this is removed by the roller 100 which also serves to guide the tape from the V-edge to the mouth of the pinch roller-capstan assembly.

During the tape feeding operation, the tape is also guided by the depression portions 46 forming part of the cover 36 which, it should be noted, is moved down to the position of FIG. 2 during operation.

During operation, the galvanometer 22 effects deflection of the stylus 24 and the heated part 26 of the latter marks the tape. Depression of the button 156 actuates the stylus 151 to provide desired coating marks on the tape.

Figure 11:
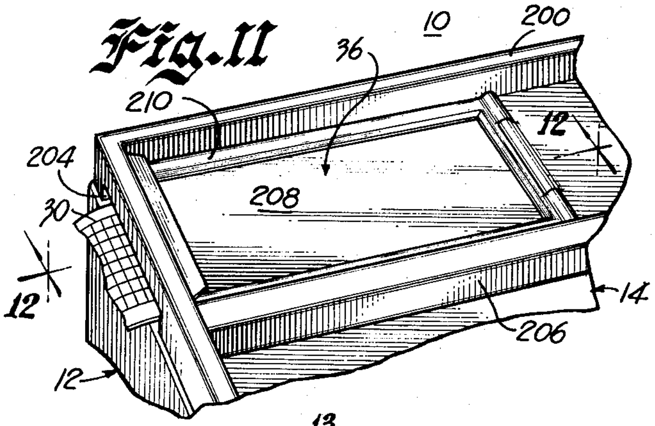
FIG. 11 is a fragmentary perspective view of a portion of another embodiment of the invention.
Figure 15:
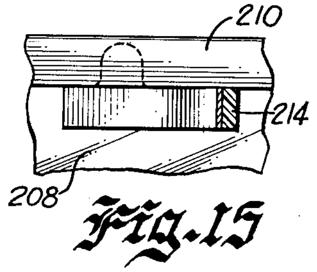
FIG. 15 is a fragmentary cross-sectional view along line 15—15 of FIG. 12.
Figure 12:
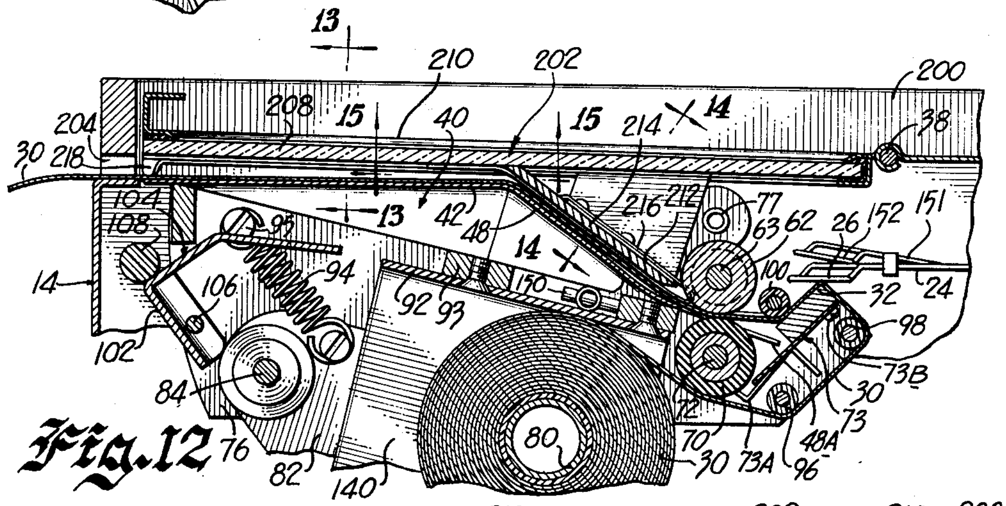
FIG. 12 is an enlarged fragmentary cross-sectional view along line 12—12 of FIG. 11.

In order to provide an improved operation further minimizing possible wrinkling of the tape which sometimes occurs under adverse humidity conditions, the cover may be constructed as shown in FIGS. 11 to 15 to which reference is now had. The electrocardiograph 10 shown only fragmentarily includes the cabinet 12 having the top 14 and a cover 36 providing access to the platen assembly 40. In the main, the apparatus shown in FIGS. 11 to 15 is like that previously described except for the construction of the frame 200 and the cover assembly 202. Referring primarily to FIG. 11, the frame 200 surrounds the periphery of the top 14 and is provided with a tape exit 204. The frame also includes an intermediate frame member 206.

Figures 13, 14:
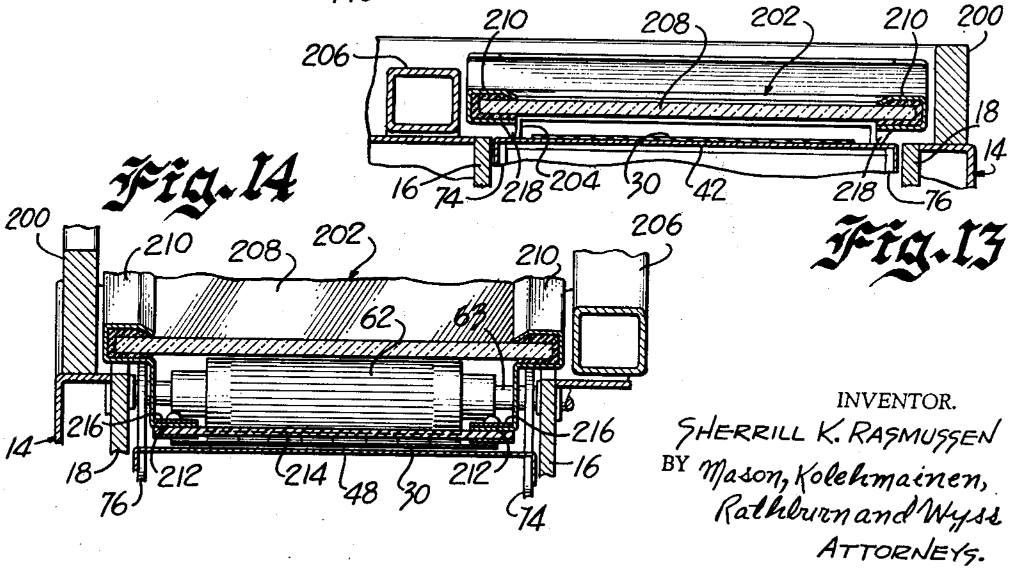
FIG. 13 is a fragmentary cross-sectional view along line 13—13 of FIG. 12.
FIG. 14 is a fragmentary cross-sectional view along line 14—14 of FIG. 12.

The cover 36 includes a transparent element 208 mounted within a metal frame 210 of generally channeled section, as shown in FIG. 13, but constructed with dependent bracket portions 212, see FIG. 14, to which is suitably secured a transparent tape depresser plate 214 extending across the width of the tape as best shown in FIG. 14. The latter is provided with a relatively sharp nose portion, see FIG. 12, which in the operated position of the cover extends as close as feasible to the driving capstan 62. This location of the depresser and the construction of the nose with a sharp point insures that the tape 30 will move between the depresser and the platen with a minimum of wrinkling. The cover is also provided with a pair of tabs 218 near its exit better to guide the tape through the exit.

The operation of this embidoment is much the same as that previously described except for the improved operation minimizing possible wrinkling of the tape as it is fed from the pinch roller-capstan assembly.

While the present invention has been described in connection with illustrative embodiments, it should be understood that the details of these embodiments are not intended to be limitative of the invention except insofar as set forth in the accompanying claims.

What is claimed as new and desired to be secured by Letters Patent of the United States is:

1. In a recording apparatus, a cabinet having a top opening, a supporting structure including a platen, means mounting said supporting structure on said cabinet for pivotal movement about a fixed first axis located adjacent one end of said opening, said supporting structure having a normal position closing said opening and being movable to a loading position in which said supporting structure is disposed substantially outside of said cabinet, capstan means mounted on said cabinet for rotation about a fixed second axis disposed immediately below said fixed first axis, record medium supporting and guiding means mounted on said supporting structure for guiding movement of a record medium to said capstan means, pinch roller means mounted on said supporting structure for rotation about a third axis, said pinch roller means being movable from a position in which said third axis is substantially aligned with an disposed below said first and second axes to a position in which said third axis is disposed above said first and second axes as said supporting structure is moved from said normal position to said loading position, and locking means on said cabinet and said supporting structure adjacent the other end of said opening for securing said supporting structure in said normal position.

2. The recording apparatus set forth in claim 1 in which said record medium supporting and guiding means includes a generally V-shaped structure spaced from said capstan means on the side thereof located away from said locking means, said V-shaped structure being disposed above said roller means and no closer to said first axis than said pinch roller means.

3. The recording apparatus set forth in claim 2 including a single roller mounted on said cabinet for rotation about a fixed fourth axis, said roller being disposed between said capstan means and said V-shaped structure and being positioned below said V-shaped means and generally in alignment with said capstan means to remove any curl from said record medium caused by said V-shaped structure.

4. The recording apparatus set forth in claim 1 in which said platen is disposed above and covers said locking means and in which an operating means for releasing said locking means includes a manually operable means accessible through said opening adjacent said one end of said opening.

5. In a recording apparatus, a cabinet having an elongated top opening, a supporting structure including platen means extending substantially the full length of the opening, means mounting said supporting structure on said cabinet for pivotal movement about a fixed first axis located adjacent one end of said opening, said supporting structure having a normal position in which said platen closes said opening and being movable to a loading position in which said supporting structure is disposed substantially outside of said cabinet, said fixed first axis permitting said structure to be pivoted to move along only a fixed path, capstan means mounted on said cabinet for rotation about a fixed second axis disposed immediately adjacent said fixed first axis, record medium supporting and guiding means mounted on said supporting structure for feeding a record medium to said capstan means, idler means rotatably mounted on said supporting structure, said idler means being movable from a position in which it biases said record means against said capstan means when said supporting structure is in said normal position to a position in which it is spaced away from and above said capstan means when said supporting structure is in said loading position, and locking means on said cabinet and said supporting structure adjacent the other end of said elongated opening for securing said supporting structure in said normal position, the fixed first axis of rotation of said supporting structure and the locking means spaced from said first axis substantially the full length of said structure cooperating to provide a first class lever arrangement for positively locking said idler means in a fixed and predetermined position in said path and to prevent any displacement of said supporting structure along said path or in directions transverse to said path.

6. The recording apparatus set forth in claim 5 including operating means for the locking means disposed beneath said platen means and including a manually actuated portion exposed adjacent said one end of said opening.

7. In a recording apparatus, a cabinet, a supporting structure pivotally mounted on said cabinet and movable from a normal position disposed within said cabinet to a loading position in which a substantial portion of said supporting structure is positioned outside of said cabinet, roll supporting means pivotally mounted on said supporting structure for supporting a roll of record medium, first wall means on said supporting structure, resilient means connected between said supporting structure and said roll supporting means for biasing the outer convolution of said roll into engagement with said first wall means to apply tension to the record medium withdrawn from said roll, and second and third wall means on said supporting structure depending downwardly from opposite sides of said first wall means to at least partially enclose the opposite edges of said roll, said roll supporting means being movable against the action of said resilient means when said supporting structure is in said loading position between a normal position in which said roll bears against said first wall means and is enclosed by said second and third wall means and a loading position in which said roll is spaced from said first wall means and is not enclosed by said second and third wall means.

8. In a recording apparatus, a cabinet, a supporting structure pivotally mounted on said cabinet and movable from a normal position disposed within said cabinet to a loading position in which a substantial portion of said supporting structure is positioned outside of said cabinet, roll supporting means pivotally mounted on said supporting structure for supporting a roll of record medium below said supporting structure and within said cabinet when said supporting structure is in said normal position, a generally U-shaped wall means on said supporting structure, and resilient means connected between said supporting structure and said roll supporting means for urging said roll supporting means upwardly toward said supporting structure to bias the outer convolution of said roll into engagement with the bight portion of said U-shaped walls means to apply tension to the record medium withdrawn from said roll, the leg portions of said U-shaped wall means depending downwardly at opposite sides of said first wall means to at least partially enclose said roll, said roll supporting means being movable against the action of said resilient means when said supporting structure is in said loading position between a normal position in which said roll bears against and is enclosed by said U-shaped wall means and a loading position in which said roll is spaced from and is not enclosed by said U-shaped wall means.

9. In a recording apparatus, a cabinet, a supporting structure pivotally mounted on said cabinet and movable from a normal position disposed within said cabinet to a loading position in which a substantial portion of said supporting structure is positioned outside of said cabinet, roll supporting means pivotally mounted on said supporting structure for supporting a roll of record medium, resilient means connected between said supporting structure and said roll supporting means for biasing said roll toward said supporting structure and first and second wall means depending downwardly from said supporting structure on opposite sides of said roll to at least partially enclose the opposite edges of said roll, said roll supporting element being movable against the action of said resilient means when said supporting structure is in said loading position from a normal position in which said roll is enclosed by said first and second wall means to a loading position in which said roll is spaced from and is not enclosed by said first and second wall means.

10. In a recording apparatus, a cabinet, a supporting structure pivotally mounted on said cabinet and movable from a normal position disposed within said cabinet to a loading position in which a substantial portion of said supporting structure is positioned outside of said cabinet, roll supporting means pivotally mounted on said supporting structure for supporting a roll of record medium for rotation about an axis, first resilient means connected between said supporting structure and said roll supporting means for biasing said roll toward said supporting structure, first and second wall means depending downwardly from said supporting structure on opposite sides of said roll to at least partially enclose the opposite edges of said roll, means mounting said wall means for relative movement in a direction parallel to said axis and second resilient means for biasing said first and second wall means for movement toward each other to engage the opposite edges of said roll, said roll supporting element being movable against the action of said first resilient means when said supporting structure is in said loading position from a normal position in which said roll is enclosed by said first and second wall means to a loading position in which said roll is spaced from and is not enclosed by said first and second wall means.

11. In a recording apparatus, a cabinet, a supporting structure pivotally mounted on said cabinet and movable from a normal position disposed within said cabinet to a loading position in which a substantaial portion of said supporting structure is positioned outside of said cabinet, roll supporting means pivotally mounted on said supporting structure for supporting a roll of record medium for rotation about an axis, first wall means on said supporting structure, first resilient means connected between said supporting structure and said roll supporting element for biasing the outer convolution of said roll into engagement with said first wall element to apply tension to the record medium withdrawn from said roll, second and third wall means on said supporting structure depending downwardly at opposite sides of said first wall means to at least partially enclose the opposite edges of said roll, means mounting said third wall means for movement parallel to said axis, and second resilient means for biasing said third wall means for movement toward said second wall means so that said roll is confined therebetween, said roll supporting element being movable against the action of said first resilient means when said supporting structure is in said loading position from a normal position in which said roll bears against said first wall means and is enclosed by said second and third wall means to a loading position in which said roll is spaced from said first wall means and is not enclosed by said second and third wall means.

No references cited.